(12) United States Patent  
Yamada et al.

(10) Patent No.: US 8,494,212 B2  
(45) Date of Patent: Jul. 23, 2013

(54) HEAD MOUNTED DISPLAY

(75) Inventors: Shoji Yamada, Kounan (JP); Mitsuyoshi Watanabe, Hashima (JP); Kazunari Taki, Nagoya (JP); Hideo Ueno, Nagoya (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 238 days.

(21) Appl. No.: 13/045,229

(22) Filed: Mar. 10, 2011

(65) Prior Publication Data

US 2011/0158478 A1 Jun. 30, 2011

Related U.S. Application Data

(63) Continuation-in-part of application No. PCT/JP2009/056240, filed on Mar. 27, 2009.

(30) Foreign Application Priority Data

Sep. 11, 2008 (JP) ................................ 2008-233852

(51) Int. Cl.  
*G06K 9/00* (2006.01)

(52) U.S. Cl.  
USPC ........................................................ 382/100

(58) Field of Classification Search  
USPC ........................................................ 382/100  
See application file for complete search history.

(56) References Cited

U.S. PATENT DOCUMENTS

| 5,720,047 | A | 2/1998 | Spitzer |
| 6,097,353 | A | 8/2000 | Melville et al. |
| 6,172,657 | B1 | 1/2001 | Kamakura et al. |
| 6,396,497 | B1* | 5/2002 | Reichlen ........................ 345/427 |
| 6,535,183 | B2 | 3/2003 | Melville et al. |
| 6,795,041 | B2* | 9/2004 | Ogawa et al. ...................... 345/7 |
| 2007/0195012 | A1* | 8/2007 | Ichikawa et al. .................. 345/8 |

(Continued)

FOREIGN PATENT DOCUMENTS

| JP | A-57-060309 | 4/1982 |
| JP | A-08-190640 | 7/1996 |

(Continued)

OTHER PUBLICATIONS

International Search Report in International Application No. PCT/JP2009/056240; dated Jul. 7, 2009 (with English-language translation).

(Continued)

*Primary Examiner* — Tom Y Lu  
(74) *Attorney, Agent, or Firm* — Oliff & Berridge, PLC

(57) ABSTRACT

A head mounted display capable of displaying necessary and sufficient number of display information in an easily viewable manner even when a large number of identifying objects are detected is provided. A see-through-type head mounted display includes a display unit which is configured to project image light corresponding to display information onto an eye of a user thus allowing the user to visually recognize an image corresponding to the image light while allowing an external light to pass therethrough. The head mounted display selects identifying objects about which associated information associated with the identifying objects are displayed by the display unit based on a result detected within an imaging area. The head mounted display displays the selected associated information associated with the identifying objects in association with the identifying objects which are visually recognized by the user through the display unit in a see-through manner.

11 Claims, 19 Drawing Sheets

U.S. PATENT DOCUMENTS

| | | | |
|---|---|---|---|
| 2007/0273610 A1* | 11/2007 | Baillot | 345/8 |
| 2008/0106488 A1 | 5/2008 | Okuno | |
| 2010/0060552 A1 | 3/2010 | Watanabe et al. | |

FOREIGN PATENT DOCUMENTS

| | | |
|---|---|---|
| JP | A-11-142784 | 5/1999 |
| JP | A-2002-509293 | 3/2002 |
| JP | A-2003-242168 | 8/2003 |
| JP | A-2006-085189 | 3/2006 |
| JP | A-2006-155191 | 6/2006 |
| JP | A-2008-009646 | 1/2008 |
| JP | A-2010-066599 | 3/2010 |
| JP | A-2010-067154 | 3/2010 |
| WO | WO 97/31477 A1 | 8/1997 |

OTHER PUBLICATIONS

Written Opinion of the International Searching Authority in international Application No. PCT/JP2009/056240; dated Jul. 7, 2009 (with partial English-language translation).

Japanese Office Action in Japanese Patent Application No. 2008-233852; dated Oct. 4, 2011 (with English-language translation).

* cited by examiner

Fig. 9

TABLE FOR DECIDING THE NUMBER OF ASSOCIATED
INFORMATIONS TO BE DISPLAYED

| THE NUMBER OF IDENTIFYING OBJECTS | THE NUMBER OF ASSOCIATED INFORMATIONS TO BE DISPLAYED |
|---|---|
| 1~10 | 4 |
| 11~20 | 5 |
| 21~ | 6 |

HEAD MOUNTED DISPLAY

CROSS-REFERENCE TO RELATED APPLICATIONS

The present application is a Continuation-in-Part of International Application PCT/JP2009/056240 filed on Mar. 27, 2009, which claims the benefits of Japanese Patent Application No. 2008-233852 filed on Sep. 11, 2008.

BACKGROUND

1. Field

The present invention relates to a head mounted display, and more particularly to a see-through-type head mounted display which projects image light corresponding to display information onto an eye of a user while allowing the transmission of an external light through the head mounted display.

2. Description of the Related Art

Conventionally, there has been known an information processing device which includes a memory unit for storing various display information such as moving image files, still image files and text files, and a playing unit for playing the display information stored in the memory unit.

A typical example of such an information processing device is a personal computer. In general, the personal computer is constituted of a computer body provided with the memory unit, the playing unit and the like, a mechanical manipulation unit such as a key board or a mouse which a user manipulates to allow the computer body to perform predetermined operations, a display which displays the display information reproduced by the playing unit as an image and the like.

As the display which displays the display information, a display device which is used in such a manner that the display device is placed on a table such as a CRT (Cathode Ray Tube) display or a liquid crystal display has been adopted in general. On the other hand, there has been also developed a head mounted display (also referred to as HMD) or the like which uses a liquid crystal display element as an image display device and allows a user to visually recognize an image while wearing the head mounted display on his head.

Further, recently, there has been also developed a head mounted display having the following constitution. That is, the head mounted display includes an optical scanning part which scans image light generated based on the image signals (hereinafter referred to as "image light") in two dimensional directions and guides the scanned image light to an eye of a user, and displays the two-dimensionally scanned image light on a retina of the user by projection by operating the optical scanning part in a state where the user mounts the head mounted display on his/her head thus allowing the user to visually recognize an image.

As such an HMD, there has been known a see-through type HMD which allows a user to visually recognize an external field of view in a see-through manner. With respect to such a sea-through-type HMD, for example, JP-A-2003-242168 discloses an HMD in which infrared rays are irradiated to an identifying object such as a bill, and content information associated with the identifying object is displayed based on an identifying object ID or the like obtained by the reflection of the irradiated infrared rays in a state where the content information is superposed on the identifying object.

SUMMARY

With respect to the above-mentioned conventional HMD, when the identifying object is detected, the content information associated with the identifying object (hereinafter also referred to as "associated information") is displayed. However, when a large number of identifying objects are detected, there exists a possibility that a display area for displaying the associated information cannot be sufficiently obtained.

Accordingly, for example, when all display information associated with the identifying objects are displayed in detail, due to the insufficient display area, there exists a possibility that the display information is overlapped with each other. On the other hand, when the display information associated with the identifying objects are not displayed in detail but is displayed in a simplified manner, there exists a possibility that the detail of the display information associated with the identifying objects which a user desires to visually recognize cannot be displayed. Under such circumstances, it is difficult for the user to visually recognize such display information and hence, there has been a demand for the enhancement of the user friendliness of the HMD.

Accordingly, it is an object of the present invention to provide a head mounted display capable of displaying necessary and sufficient number of display information in an easily viewable manner even when a large number of identifying objects are detected.

To achieve the above-mentioned object, according to one aspect of the present invention, there is provided a head mounted display including: a display unit which projects image light corresponding to display information onto an eye of a user thus allowing the user to visually recognize an image corresponding to the image light while allowing an external light to pass therethrough; an imaging unit which images at least a portion of a range of the viewing field of the user; an identifying object detection unit which detects identifying objects within an imaging area defined by the imaging unit; an associated information storage unit which stores associated information associated with the respective identifying objects; an identifying object selection unit which selects the identifying object about which the associated information associated with the selected identifying object is displayed by the display unit based on a result detected by the identifying object detection unit; and a display control unit which performs a control of allowing the display unit to display the associated information which is stored in the associated information storage unit and is associated with the identifying object which is selected by the identifying object selection unit in association with the identifying object which is visually recognized by the user through the display unit in a see-through manner.

BRIEF DESCRIPTION OF THE DRAWINGS

FIG. 9 is an explanatory view showing one example of a table for deciding the number of associated information to be displayed;

BEST MODE FOR CARRYING OUT THE INVENTION

Hereinafter, one embodiment of the present invention is explained specifically in conjunction with drawings.

[Overview of HMD]

Figure 1:
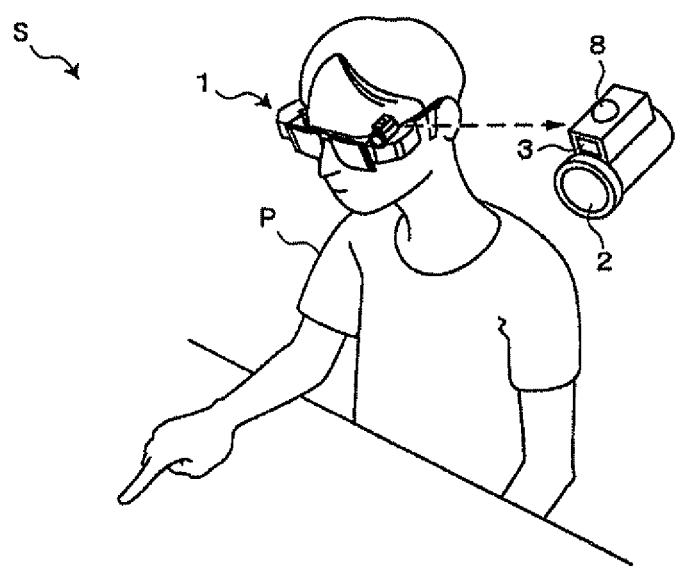
FIG. 1 is an explanatory view showing an HMD system according to one embodiment of the present invention.

As shown in FIG. 1, a head mounted display (hereinafter, referred to as "HMD") system S according to this embodiment includes an HMD 1 which allows a user P to visually recognize various content information such as moving image files, still image files and text files as an image in a state where the HMD 1 is mounted on a head of the user P.

The HMD 1 includes an optical scanning part 10 (see FIG. 2) which converts various content information stored in the HMD 1 or an external device into image signals, performs scanning of image light generated based on the image signals (hereinafter referred to as "image light"), and guides the scanned image light to an eye of the user P. By operating the scanning part 10 in a state where the HMD 1 is mounted on the head of the user P, scanning of the image light is performed on a retina of the user P in two-dimensional directions thus allowing the user P to visually recognize an image corresponding to the content information (hereinafter simply referred to as "content"). The specific constitution of the HMD 1 is explained in detail later.

Further, the HMD 1 is configured such that the user P can visually recognize surroundings in a region other than a region where the content is displayed within a viewing field of the user P even when the HMD 1 is in the midst of displaying the content.

That is, the HMD 1 is a see-through-type head mounted display which projects image light corresponding to content information onto an eye of the user P while allowing the transmission of external light through the HMD 1.

In this HMD system S, the HMD 1 detects an identifying object such as a two-dimensional code (for example, a QR code) and performs a display control in which content information associated with the identifying object is displayed. Accordingly, content information associated with the identifying object may also be referred to as associated information hereinafter.

That is, the HMD 1 of this embodiment includes a CCD (Charge Coupled Device) sensor 2 which constitutes an imaging unit for imaging at least a partial area within a viewing field of the user P, selects content information associated with the identifying object out of plural kinds of content information under the condition that the identifying object is present within an imaging area of the CCD sensor 2, and displays the selected content information.

Particularly, in this embodiment, a predetermined amount of content information is selectively displayed out of content information associated with the detected identifying objects, and hence, even when the large number of identifying objects is detected, the content information can be displayed in an easily viewable manner in view of a size of the display region.

As shown in FIG. 1, the HMD 1 includes a brightness sensor 8 which detects brightness of surroundings and an LED (light emitting diode) 3 which constitutes an illuminating unit which illuminates the imaging area of the CCD sensor 2. When the brightness sensor 8 detects that the brightness of the surroundings becomes lower than predetermined brightness, the LED 3 illuminates the imaging area of the CCD sensor 2.

[Electric Constitution of HMD]

Figure 2:
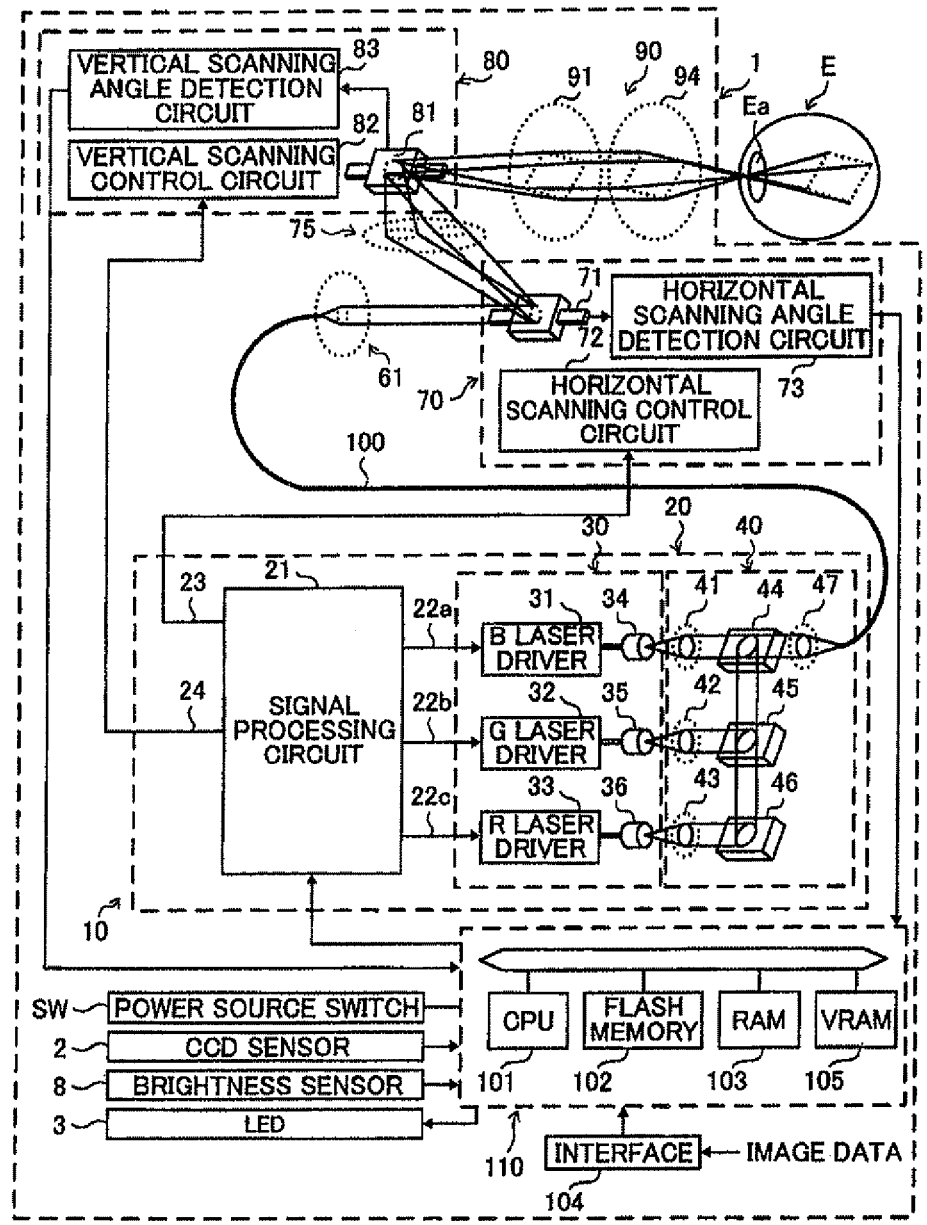
FIG. 2 is an explanatory view showing the electric and optical constitution of an HMD according to one embodiment of the present invention.

Here, the electric constitution and the like of the HMD 1 according to this embodiment are explained in conjunction with FIG. 2.

As shown in FIG. 2, the HMD 1 includes a control part 110 which performs a systematic control of the operation of the whole HMD 1 and an optical scanning part 10 which displays an image by scanning image light generated based on an image signal supplied from the control part 110 in two-dimensional directions thus allowing the user to visually recognize the image corresponding to the image signal.

The optical scanning part 10 includes an image light generating part 20 which reads out an image signal supplied from the control part 110 for every dot clock, and generates and irradiates image light whose intensity is modulated corresponding to the read-out image signal. Further, the optical scanning part 10 includes, between the image light generating part 20 and an eye E of the user P, a collimation optical system 61 which collimates the laser beams (image light) which are generated by the image light generating part 20 and are irradiated via an optical fiber 100, a horizontal scanning part 70 which functions as a first optical scanning part for scanning the image light collimated by the collimation optical system 61 in a horizontal direction (first direction) in a reciprocating manner for an image display, a vertical scanning part 80 which functions as a second optical scanning part for scanning the image light scanned in the horizontal direction using the horizontal scanning part 70 in a vertical direction (second direction substantially orthogonal to the first direction) in a reciprocating manner, a relay optical system 75 which is arranged between the horizontal scanning part 70 and the vertical scanning part 80, and a relay optical system 90 which irradiates the image light scanned in the horizontal direction as well as in the vertical direction (scanned two-dimensionally) onto the pupil Ea.

The image light generating part 20 includes a signal processing circuit 21. An image data supplied from the external device such as a personal computer (not shown in the drawing) is inputted to the signal processing circuit 21 via an interface 104 and a control part 110. Based on the image signal, the signal processing circuit 21 generates respective signals and the like which constitute components for synthesizing an image. The image signals 22*a* to 22*c* of blue (B), green (G) and red (R) are generated and outputted by the signal processing circuit 21. Further, the signal processing circuit 21 outputs a horizontal drive signal 23 used in the horizontal scanning part 70 and a vertical drive signal 24 used in the vertical scanning part 80 respectively.

The image light generating part 20 includes a light source part 30 which functions as an image light output part for forming three image signals (B, G, R) 22*a* to 22*c* outputted from the signal processing circuit 21 for respective dot clocks into image lights respectively, and an optical synthesizing part 40 which generates an arbitrary image light by combining these three image lights into one image light.

The light source part 30 includes a B laser 34 which generates a blue image light, a B laser driver 31 which drives the B laser 34, a G laser 35 which generates a green image light, a G laser driver 32 which drives the G laser 35, an R laser 36 which generates a red image light, and an R laser driver 33 which drives the R laser 36. Here, each laser 34, 35, 36 may be constituted of a semiconductor laser or a solid-state laser provided with a harmonic generating mechanism, for example. Here, when the semiconductor laser is used as the laser 34, 35, 36, the intensity of the image light may be modulated by directly modulating a drive current, while when the solid laser is used as the laser 34, 35, 36, it is necessary to modulate the intensity of the image light by providing an external modulator to each laser 34, 35, 36.

The optical synthesizing part 40 includes collimation optical systems 41, 42, 43 provided for collimating the image lights incident from the light source part 30 into parallel image lights, dichroic mirrors 44, 45, 46 provided for synthesizing the collimated image lights, and a coupling optical system 47 which guides the synthesized image light to the optical fiber 100.

The laser beams irradiated from the respective lasers 34, 35, 36 are, after being collimated by the collimation optical systems 41, 42, 43 respectively, incident on the dichroic mirrors 44, 45, 46. Thereafter, the respective image lights are selectively reflected on or are allowed to pass through these dichroic mirrors 44, 45, 46 corresponding to wavelengths thereof.

To be more specific, the blue image light irradiated from the B laser 34 is, after being collimated by the collimation optical system 41, incident on the dichroic mirror 44. The green image light irradiated from the G laser 35 is incident on the dichroic mirror 45 via the collimation optical system 42. The red image light irradiated from the R laser 36 is incident on the dichroic mirror 46 via the collimation optical system 43.

The image lights of three primary colors which are respectively incident on these three dichroic mirrors 44, 45, 46 are reflected on the dichroic mirrors 44, 45, 46 or are allowed to pass through the dichroic mirrors 44, 45, 46 selectively corresponding to wavelengths thereof, and arrive at the coupling optical system 47 and are converged by the coupling optical system. Then, the converged image lights are outputted to the optical fiber 100.

The horizontal scanning part 70 and the vertical scanning part 80, to bring the image lights incident from the optical fiber 100 into a state which allows the image lights to be projected as an image, scan the image lights in a horizontal direction as well as in a vertical direction to form scanned image lights.

The horizontal scanning part 70 includes a resonance-type polarizing element 71 which includes a reflective surface for scanning the image light in the horizontal direction, a horizontal scanning drive circuit 72 which constitutes a drive signal generator for generating a drive signal which oscillates the reflective surface of the resonance-type polarizing element 71 by allowing the resonance-type polarizing element 71 to generate resonance, and a horizontal scanning angle detection circuit 73 which detects an oscillation state such as an oscillation range and an oscillation frequency of the reflective surface of the resonance-type polarizing element 71 based on a displacement signal outputted from the resonance-type polarizing element 71.

In this embodiment, the horizontal scanning angle detection circuit 73 is configured to input a signal indicative of the detected oscillation state of the resonance-type polarizing element 71 to the control part 110.

The vertical scanning part 80 includes a polarizing element 81 for scanning the image light in the vertical direction, a vertical scanning control circuit 82 for driving the polarizing element 81, and a vertical scanning angle detection circuit 83 for detecting an oscillation state such as an oscillation range and an oscillation frequency of the reflective surface by the vertical scanning control circuit 82.

The horizontal scanning drive circuit 72 and the vertical scanning control circuit 82 are respectively driven based on a horizontal drive signal 23 and a vertical drive signal 24 outputted from the signal processing circuit 21, and the vertical scanning angle detection circuit 83 is configured to input a signal indicative of the detected oscillation state of the polarizing element 81 to the control part 110.

The control part 110 described in detail later is configured to adjust the horizontal drive signal 23 and the vertical drive signal 24 by controlling the operation of the signal processing circuit 21 thus allowing the horizontal scanning part 70 and the vertical scanning part 80 to change the scanning angles of the image light whereby the brightness of the image displayed can be adjusted.

The scanning angles changed in this manner are detected by the control part 110 based on detection signals from the horizontal scanning angle detection circuit 73 and the vertical scanning angle detection circuit 83, and are fed back to the horizontal drive signal 23 via the signal processing circuit 21 and the horizontal scanning drive circuit 72 and, at the same time, are fed back to the vertical drive signal 24 via the signal processing circuit 21 and the vertical scanning control circuit 82.

Further, the HMD 1 includes a relay optical system 75 for relaying the image light between the horizontal scanning part 70 and the vertical scanning part 80. The light scanned in the horizontal direction by the resonance-type polarizing element 71 is converged on the reflective surface of the polarizing element 81 by the relay optical system 75, is scanned in the vertical direction by the polarizing element 81, and is irradiated to a relay optical system 90 as a scanned image light scanned two-dimensionally.

The relay optical system 90 includes lens systems 91, 94 having a positive refractive power. The scanned image lights for display irradiated from the vertical scanning part 80, using the lens system 91, have center lines thereof respectively arranged approximately parallel to each other and are respectively converted into converged image lights. Then, using the lens system 94, the converged image lights are arranged approximately parallel to each other and, at the same time, are converted such that the center lines of these image lights are converged on a pupil Ea of the user P.

Here, according to this embodiment, the image light incident from the optical fiber 100 is scanned in the horizontal direction by the horizontal scanning part 70 and, thereafter, is scanned in the vertical direction by the vertical scanning part 80. However, the arrangement of the horizontal scanning part 70 and the arrangement of the vertical scanning part 80 may be exchanged, and the image light may be scanned in the vertical direction by the vertical scanning part 80 and, thereafter, may be scanned in the horizontal direction by the horizontal scanning part 70.

Further, the control part 110 includes a CPU (Central Processing Unit) 101, a flash memory 102 which constitutes a non-volatile memory as a ROM (Read Only Memory) (in the drawing, shown as "Flash Memory"), a RAM (Random Access Memory) 103, and a VRAM (Video Random Access Memory) 105 which stores image data to be displayed.

The CPU 101, the flash memory 102, the RAM 103, and the VRAM 105 are respectively connected to a bus for data communication, and the transmission and reception of various information are performed via the bus for data communication.

Further, the control part 110 is also connected with a power source switch SW of the HMD 1, the CCD sensor 2 which images the images including the identifying objects, the brightness sensor 8 which detects brightness of surroundings, an LED 3 which illuminates an imaging range A (see FIG. 4) of the CCD sensor 2 when the brightness sensor 8 detects that the brightness of surroundings becomes lower than the predetermined brightness, and an interface 104 which can be connected with an external device such as a personal computer.

The CPU 101 is an arithmetic processing device which executes various functions provided to the HMD 1 by operating various circuits not shown in the drawing which constitutes the HMD 1 by executing various information processing programs stored in the flash memory 102.

The flash memory 102 stores various information processing programs executed by the CPU 101 for allowing the control part 110 to perform a systematic control of the operation of the whole HMD 1. That is, the flash memory 102 stores information processing programs for operating the image light generating part 20, the horizontal scanning part 70, the vertical scanning part 80 and the like at the time of performing the display control such as play, stop, fast forward and rewind of the content displayed by the HMD 1.

Further, the flash memory 102 stores plural kinds of tables which the control part 110 references in performing various display controls, for example, a table which the control part 110 uses for determining the configuration of the identifying objects imaged by the CCD sensor 2 and the like.

[Functional Constitution of HMD]

Figure 3:
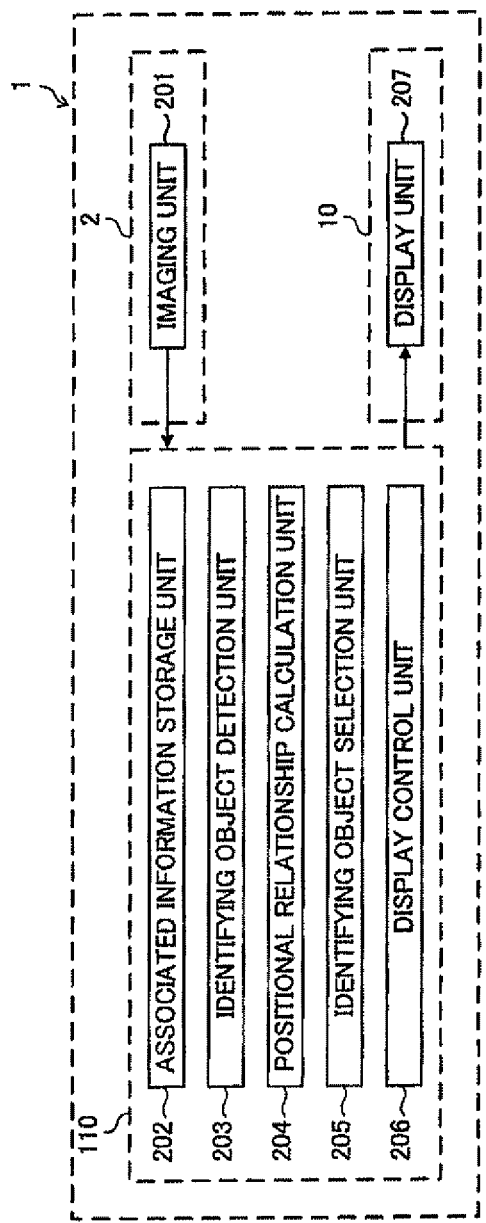
FIG. 3 is an explanatory view showing the functional constitution of the HMD according to one embodiment of the present invention.

Here, the functional constitution and the like of the HMD 1 according to this embodiment are explained in conjunction with FIG. 3.

As shown in FIG. 3, the CCD sensor 2 of the HMD 1 includes an imaging unit 201. The imaging unit 201 images at least a portion of a range of a viewing field of the user. The imaging unit 201 supplies imaged data or image data (hereinafter referred to as image data) to the control part 110.

Here, the control part 110 of the HMD 1 includes an associated information storage unit 202, an identifying object detection unit 203, a positional relationship calculation unit 204, an identifying object selection unit 205 and a display control unit 206. That is, in the control part 110 of the HMD 1, by executing predetermined information processing programs, a CPU 101 described later functions as the identifying object detection unit 203, the positional relationship calculation unit 204, the identifying object selection unit 205 and the display control unit 206.

The above-mentioned flash memory 102 corresponds to the associated information storage unit 202, and the associated information storage unit 202 stores content information (associated information) associated with the respective identifying objects.

The identifying object detection unit 203 detects identifying objects based on image data on an imaging area imaged by the imaging unit 201.

The positional relationship calculation unit 204 calculates a positional relationship between the HMD 1 (the user wearing the HMD 1) and the identifying object based on a range of imaged pixels imaged as the identifying object by the imaging unit 201. In this embodiment, such a positional relationship is a distance between the identifying object and the HMD 1 and the like. However, the positional relationship is not limited to the distance between the identifying object and the HMD 1. Although the detailed explanation is made later as another embodiment, for example, the positional relationship may be an angle made by a straight line which connects the identifying object and the HMD 1 and the direction extending toward a front side of the user or the like.

The identifying object selection unit 205 selects the identifying objects about which associated content information associated with the identifying objects is displayed by a display unit 207 described later based on a result detected by the identifying object detection unit 203. Particularly, the identifying object selection unit 205 selects the identifying objects about which content information is displayed based on the positional relationship such as the relationship of the distance between the HMD 1 and the identifying object calculated by the positional relationship calculation unit 204.

The display control unit 206 performs a control of allowing the display unit 207 to display an image corresponding to the image data. In this embodiment, the display control unit 206 performs a control of reading the content information associated with the identifying objects selected by the identifying object selection unit 205 from the associated information storing unit 202, and a control of allowing the display unit 207 to display the content information. Particularly, the display control unit 206 performs a control of displaying the content information associated with the identifying objects in such a manner that the content information is associated with the identifying objects which are visually recognized by the user through the display unit 207 in a see-through manner.

The optical scanning part 10 of the HMD 1 includes the display unit 207. By projecting image light corresponding to image information (display information) onto an eye of the user, the display unit 207 allows the user to visually recognize an image corresponding to the image light while allowing external light to pass through the display unit 207.

[Display Contents of HMD]

Here, contents or the like displayed by the HMD 1 according to this embodiment are explained in conjunction with FIG. 4A to FIG. 4F.

Figure 4A:
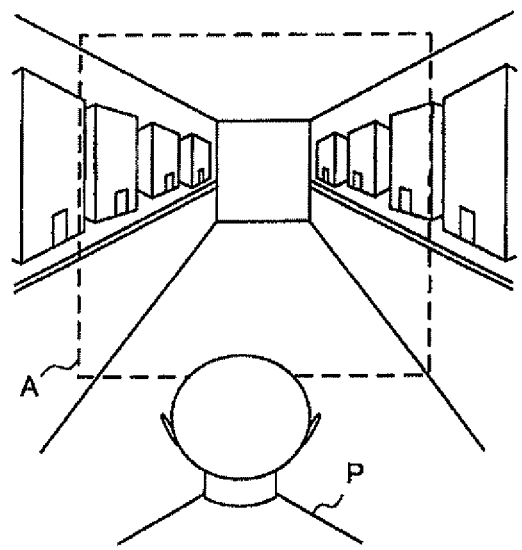
FIG. 4A is an explanatory view showing display contents and the like of the HMD according to one embodiment of the present invention.

A situation where the user P wearing the HMD 1 looks for an article in a warehouse-like place is explained as one example. As shown in FIG. 4A, cardboard boxes in which various kinds of articles are stored are arranged parallel to each other in the warehouse. A partial area within a range of the viewing field of the user P is set as an imaging area A.

Figure 4B:
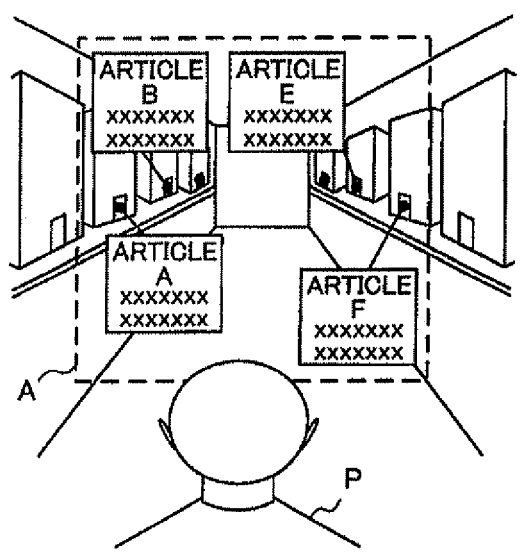
FIG. 4B is an explanatory view showing display contents and the like of the HMD according to one embodiment of the present invention.

In such a situation, as shown in FIG. 4B, when six identifying objects are detected within the imaging area A, six black dot marks indicative of positions of the respective identifying objects are displayed. Then, content information which is respectively associated with four identifying objects out of six identifying objects are displayed.

Figure 4C:
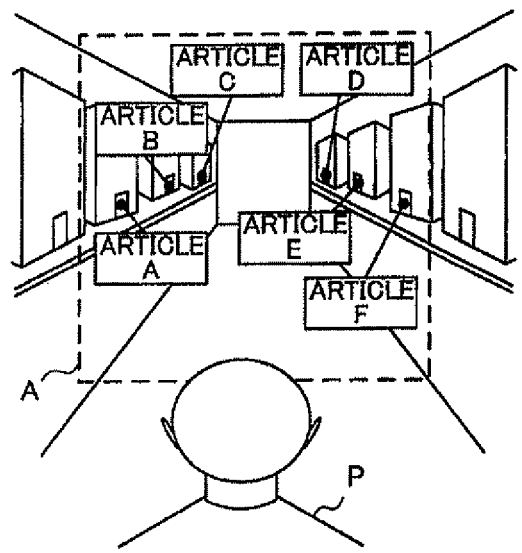
FIG. 4C is an explanatory view showing display contents and the like obtained by the HMD according to one embodiment of the present invention.

In the related art, as shown in FIG. 4C, when six identifying objects are detected, six content informations which are associated with all identifying objects are respectively displayed. In this embodiment, however, as shown in FIG. 4B, content informations which are respectively associated with four identifying objects out of six identifying objects are displayed. This means that four identifying objects are selected out of six identifying objects. In this embodiment, particularly, four identifying objects are selected in order from the identifying object closest to the user P (for example, in order of article A, article B, article E and article F).

[Calculation of Positional Relationship Between User and Identifying Object]

The calculation of the positional relationship between the identifying objects and the user P is explained in conjunction with FIG. 5A to FIG. 5D.

Figure 5A:
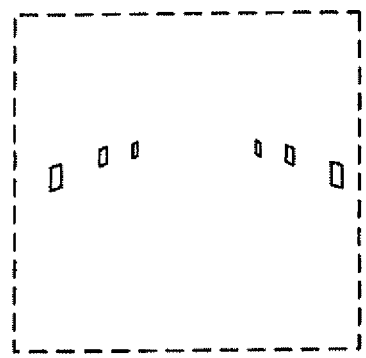
FIG. 5A is an explanatory view relating to a calculation of a positional relationship between an identifying object and a user in the HMD according to one embodiment of the present invention.
Figure 5B:
FIG. 5B is an explanatory view relating to a calculation of a positional relationship between an identifying object and a user in the HMD according to one embodiment of the present invention.
Figure 5C:
FIG. 5C is an explanatory view relating to a calculation of a positional relationship between an identifying object and a user in the HMD according to one embodiment of the present invention.
Figure 5D:
FIG. 5D is an explanatory view relating to a calculation of a positional relationship between an identifying object and a user in the HMD according to one embodiment of the present invention.

In the CCD sensor 2 which images the identifying objects, respective pixels are arranged in a matrix array. Accordingly, when an image shown in FIG. 4A is imaged, as shown in FIG. 5A, ranges constituted of imaged pixels which can be recognized as identifying objects respectively are detected from the imaged image. Further, as shown in FIG. 5B to FIG. 5D, a range constituted of the imaged pixels is detected for every identifying object. Based on each range constituted of the imaged pixels corresponding to the identifying object detected in this manner, distances between the identifying objects and the user P, angles made by straight lines which connect the identifying objects and the user and the direction extending toward a front side of the user or the like can be calculated. In this manner, based on the range constituted of the imaged pixels which is imaged as the identifying object, the positional relationship between the identifying objects and the user P is calculated.

As described above, the positional relationship between the identifying objects and the user P is calculated based on the ranges constituted of the imaged pixels which are imaged as the identifying objects. Accordingly, the positional relationship can be calculated based on the imaged image and hence, the positional relationship can be recognized with the simple constitution.

[Control Operation]

Figure 6:
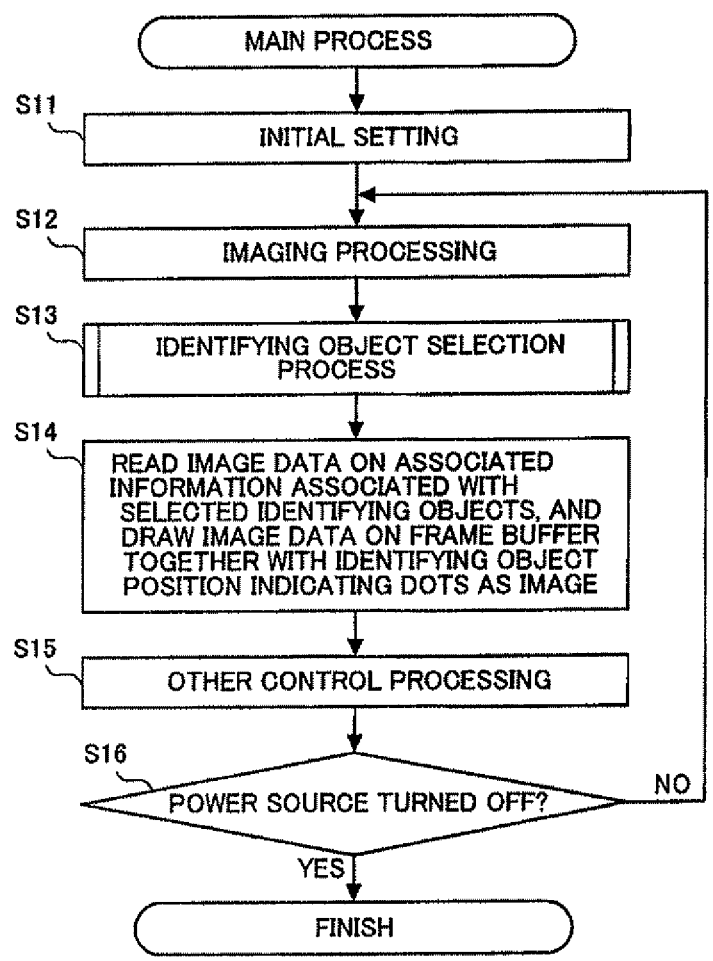
FIG. 6 is a flowchart showing an exemplary process for controlling the HMD.
Figure 7:
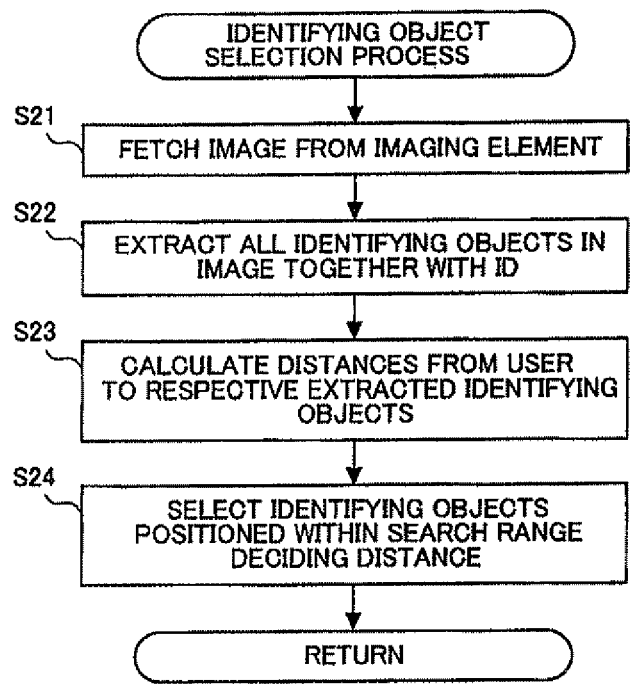
FIG. 7 is a flowchart showing an exemplary process for controlling the HMD.

Next, the manner of operation of the HMD1 is explained in conjunction with flowcharts shown in FIG. 6 and FIG. 7.

Particularly, an exemplary main process shown in FIG. 6 is executed by the control part 110 when a power source of the HMD 1 is turned on. Here, the main process which the control part 110 of the HMD 1 (hereinafter simply referred to as "control part 110") executes is explained, and the explanation of processes other than the main process is omitted.

In the HMD 1 of this embodiment, by executing information processing programs stored in the flash memory 102, the CPU 101 of the control part 110 functions as the above-mentioned identifying object detection unit, positional relationship calculation unit, identifying object selection unit, display control unit 206 and the like.

[Main Process]

Firstly, as shown in FIG. 6, when electricity is supplied to the HMD 1, the CPU 101 of the control part 110 performs the initial setting (step S11). In this process, the control part 110 executes the RAM access permission, the initialization of a working area and the like. Further, the control part 110 sets a selection range of identifying objects about which associated information is displayed by the display unit 207 within the imaging area A. When this process is finished, the main process advances to step S12.

In step S12, the control part 110 executes imaging processing. In this imaging processing, the control part 110 performs a control of allowing the CCD sensor 2 to function as the imaging unit 201 to image an image of the imaging area A. When this process is finished, the main process advances to step S13.

In step S13, the control part 110 executes identifying object selection processing. Although the detailed explanation is made later in conjunction with FIG. 7, in this process, the control part 110 detects identifying objects from the image of the imaging area which is imaged by the CCD sensor 2, calculates distances between the detected identifying objects and the HMD 1, and selects the identifying objects about which content information is displayed by the display unit 207 out of the plurality of identifying objects based on the calculated distances. When this process is finished, the main process advances to step S14.

In step S14, the control part 110 reads image data on associated information which is associated with the selected identifying objects from the flash memory 102, and draws the image data on a frame buffer of a VRAM 105 as an image together with identifying object position indicating dots. Due to such processing, the control part 110 supplies the image drawn on the frame buffer to the optical scanning part 10 together with the identifying object position indicating dots thus displaying the image such that the user P can visually recognize the image. Particularly, as shown in FIG. 4B, the display unit 207 displays the identifying objects and the associated information which is associated with the identifying objects such that the associated information is associated with the identifying objects within a range of viewing field where the user can visually recognize the identifying objects through the display unit 207 in a see-through manner. That is, the control part 110 performs a control of displaying the associated information which is associated with the selected identifying objects in such a manner that the associated information is associated with the identifying objects which are visually recognized by the user through the display unit 207 in a see-through manner. By executing such processing, the CPU 101 of the control part 110 functions as the display control unit 206. Here, also when the associated information which is associated with the selected identifying objects are moving image contents, the control part 110 draws the associated information which is associated with the identifying objects on the frame buffer as the image for every predetermined period. When this process is finished, the main process advances to step S15.

In step S15, the control part 110 executes control processing other than the main control processing. Then, the control part 110 determines whether or not the power source is turned off (step S16). In this process, the control part 110 determines whether or not the power source is turned off in response to the manipulation of the power source switch SW or the like. When the control part 110 determines that the power source is turned off (step S16: YES), the main process is finished. On the other hand, when the control part 110 determines that the power source is not turned off (step S16: NO), the main process returns to step S12 again. In this manner, the control part 110 repeatedly executes the main process ranging from the main process in step S12 to the main process in step S15 until the power source is turned off.

[Identifying Object Selection Process]

A sub routine executed in step S13 shown in FIG. 6 is explained in conjunction with FIG. 7.

Firstly, as shown in FIG. 7, the control part 110 fetches the image from an imaging element (step S21). In this process, the control part 110 fetches the image of the imaging area A which is imaged by the CCD sensor 2 which constitutes the imaging unit 201, and stores the image in the RAM 103. When this process is finished, the process advances to step S22.

In step S22, the control part 110 extracts all identifying objects in the image together with IDs. In this process, the control part 110 detects the identifying objects from the image of the imaging area A which is fetched in the process in step S21. Then, when the identifying objects are detected, the control part 110 reads the IDs included in the detected identifying objects. Due to such processing, the control part 110 can recognize a kind of identifying object. By executing such processing, the CPU 101 of the control part 110 functions as the identifying object detection unit 203. When this process is finished, the process advances to step S23.

In step S23, the control part 110 calculates distances from the user to respective extracted identifying objects. In this process, for every identifying object detected in the process in step S22, the control part 110 calculates a distance between the identifying object and the HMD 1 (the user P wearing the HMD 1) based on a range of the imaged pixels which are imaged as the identifying object as the positional relationship between the identifying object and the HMD 1. By executing such processing, the CPU 101 of the control part 110 functions as the positional relationship calculation unit 204. When this process is finished, the process advances to step S24.

In step S24, the control part 110 selects the identifying objects positioned within a search range deciding distance. In this process, the control part 110 reads the search range deciding distance which is set in advance from the flash memory 102. Then, the control part 110 references the search range deciding distance and the distances between the identifying objects and the HMD 1 which are calculated in the process in step S23. The control part 110 selects the identifying objects positioned within the search range deciding distance, and stores the identifying objects in a predetermined region of the RAM 103. That is, the control part 110 sets the selection range of identifying objects about which associated information is displayed (above-mentioned search range deciding distance) within the imaging area A and, based on the distances between the detected identifying objects and the user P, the control part 110 selects at least any one of the identifying objects within the selection range as an identifying object about which associated information is displayed by the display unit 207. By executing such processing, the CPU 101 of the control part 110 functions as the identifying object selection unit 205. In this embodiment, the control part 110 selects the identifying objects which are positioned within the search range deciding distance in order from the identifying object closest to the user with four identifying objects as an upper limit. When this process is finished, this sub routine is finished.

In this manner, the imaging unit 201 images at least a portion of the range of the viewing field of the user, and the control part 110 detects the identifying objects within the imaging area. Then, the control part 110 selects the identifying objects about which associated information is displayed by the display unit based on a detected result. Further, the control part 110 performs a control of allowing the display unit to display the associated information which is associated with the selected identifying objects in such a manner that the associated information is associated with the identifying objects which are visually recognized by the user through the display unit in a see-through manner. Accordingly, even when a large number of identifying objects are detected, the control part 110 selects the identifying objects about which associated information is displayed by the display unit based on a result of detection of the identifying objects and hence, the HMD 1 can display necessary and sufficient number of display information in an easily viewable manner even when a large number of identifying objects are detected.

Further, the control part 110 sets the selection range of the identifying objects about which associated information is displayed by the display unit within the imaging area based on the positional relationship between the detected identifying objects and the user, and selects at least any one of the identifying objects within the selection range as an identifying object about which associated information is displayed. The control part 110 selects the identifying objects within the set selection range as the identifying objects about which associated information is displayed based on the positional relationship between the detected identifying objects and the user and hence, it is possible to select identifying objects corresponding to such a positional relationship. Further, the user can select the identifying objects about which associated information is displayed while being conscious of the positional relationship between the identifying objects and the user. Accordingly, even when a large number of identifying objects are detected, the HMD 1 can display the display information in an easily viewable manner without imposing a cumbersome manipulation on the user.

Further, control part 110 selects the identifying objects about which associated information is displayed by using distances between the detected identifying objects and the user as the positional relationship. Accordingly, it is possible to select the identifying objects which are associated with the distances from the user. For example, it is possible to select the identifying objects by assigning priority to the identifying objects near the user so that the manipulation of the HMD 1 can be easily performed. Further, the user can select the identifying objects about which associated information is displayed while being conscious of the positional relationship between the detected identifying objects and the user. Accordingly, even when a large number of identifying objects are detected, the HMD 1 can display the display information in an easily viewable manner without imposing a cumbersome manipulation on the user.

Second Embodiment

In the above-mentioned embodiment, the identifying objects about which associated information is displayed are selected based on the distances between the HMD 1 and the identifying objects. However, the present invention is not limited to this embodiment, and the identifying objects about which associated information is displayed may be selected based on angles made between straight lines which connect the identifying objects and the HMD 1 and the direction extending toward a front side of the user P. That is, the identifying objects about which associated information is displayed may be selected based on the positional relationship between the detected identifying objects and the HMD 1.

One specific embodiment is explained hereinafter in conjunction with FIG. 4D and FIG. 8. In this embodiment, to facilitate the understanding of the invention, the explanation is made mainly with respect to the constitution and the processes which differ from the constitution and the processes in the first embodiment and the explanation of the constitution and the processes substantially equal to the constitution and the processes in the first embodiment is omitted.

[Display Contents of HMD]

Figure 4D:
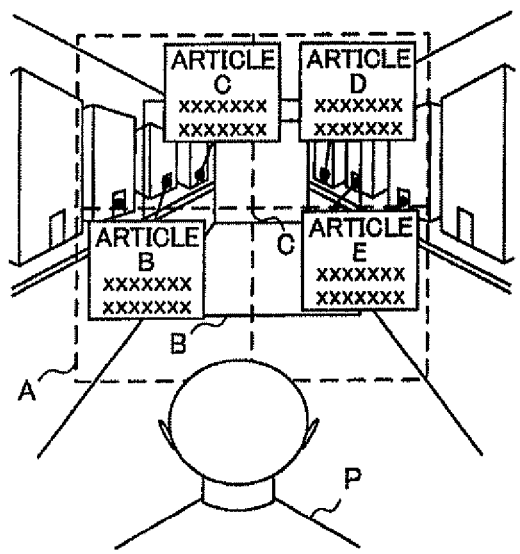
FIG. 4D is an explanatory view showing display contents and the like obtained by the HMD according to one embodiment of the present invention.

In this embodiment, as shown in FIG. 4D, content information which is respectively associated with four identifying objects out of six identifying objects are displayed in imaging area A. However, the identifying objects in this embodiment differ from the identifying objects in the above-mentioned embodiment. That is, different from the above-mentioned embodiment, the identifying objects are selected based on the angles made between straight lines which connects the identifying objects and the user P and the direction extending toward a front side of the user P and hence, the content information is displayed by assigning priority to the identifying objects near the center of a range of viewing field (for example, article B, article C, article D, article E). Further, a search range deciding angle image B indicative of a preset search range deciding angle is displayed for deciding whether or not the content information is to be displayed.

[Identifying Object Selection Process]

Figure 8:
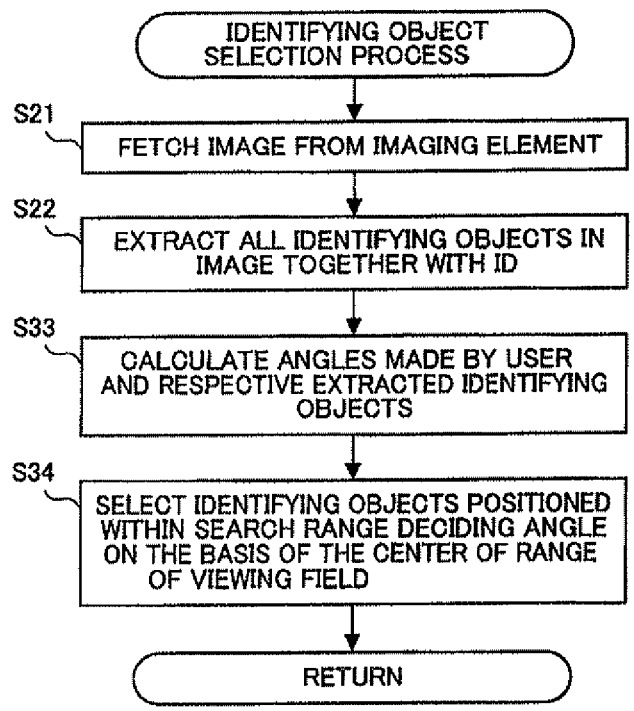
FIG. 8 is a flowchart showing an exemplary process for controlling the HMD.

A sub routine executed in step S13 shown in FIG. 6 is explained in conjunction with FIG. 8.

Firstly, as shown in FIG. 7, the control part 110 fetches the image from an imaging element (step S21), and extracts all identifying objects in the image together with IDs (step S22). When this process is finished, the process advances to step S33.

In step S33, the control part 110 calculates angles made by the user and respective extracted identifying objects. In this process, for every identifying object detected in the process in step S22, the control part 110 calculates an angle made by the identifying object and the HMD 1 (the user P wearing the HMD 1) based on a range of the imaged pixels which are imaged as the identifying object as the positional relationship between the identifying object and the HMD 1. Here, the angle made by the identifying object and the HMD 1 (the user P wearing the HMD 1) means an angle made by a straight line which connects the identifying object and the user P and the direction extending toward a front side of the user P. By executing such processing, the CPU 101 of the control part 110 functions as the positional relationship calculation unit 204. When this process is finished, the process advances to step S34.

In step S34, the control part 110 selects the identifying objects positioned within a search range deciding angle on the basis of the center of the range of the viewing field. In this process, the control part 110 reads out the search range deciding angle which is set in advance from a flash memory 102. Then, the control part 110 references the search range deciding angle and the angles made by the identifying objects and the HMD 1 which are calculated in the process in step S33.

The control part 110 selects the identifying objects positioned within the search range deciding angle on the basis of the center of the range of the viewing field, and stores the identifying objects in a predetermined region of the RAM 103. That is, the control part 110 sets the selection range of identifying objects about which associated information is displayed (above-mentioned search range deciding angle) within an imaging area A and, based on the angles made by straight lines which connect the detected identifying objects and the user P and the direction extending toward the front side of the user P, the control part 110 selects at least any one of the identifying objects within the selection range as an identifying object about which associated information is displayed by the display unit 207. Particularly, the control part 110 selects the identifying objects about which associated information is displayed by assigning priority to the identifying objects having the close positional relationship on the basis of the center of the range of the viewing field of the user P. By executing such processing, the CPU 101 of the control part 110 functions as the identifying object selection unit 205. In this embodiment, the control part 110 selects the identifying objects which are positioned within the search range deciding angle in order from the identifying object closest to the center of the range of the viewing field with four identifying objects set as an upper limit. When this process is finished, this sub routine is finished.

In this manner, the control part 110 selects the identifying objects about which associated information is displayed by using angles made by the straight lines which connect the detected identifying objects and the user and the direction extending toward the front side of the user as the positional relationship. Accordingly, it is possible to select the identifying objects which are associated with the angles made by straight lines which connect the identifying objects and the user and the direction extending toward the front side of the user. Further, the user can select the identifying objects about which associated information is displayed while being conscious of the angles made by the identifying objects and the user. Accordingly, even when a large number of identifying objects are detected, the HMD1 can display the display information in an easily viewable manner without imposing a cumbersome manipulation on the user.

Further, out of the detected identifying objects, as the identifying objects about which associated information is displayed, the identifying objects positioned near the center of a range of viewing field of the user are selected with priority. Accordingly, it is possible to select the identifying objects near the center of the range of viewing field of the user with priority so that the process becomes simple.

Third Embodiment

In the above-mentioned embodiments, the identifying objects about which associated information is displayed are selected based on whether the positional relationship between the HMD 1 and the user P falls within the predetermined selection range and the number of identifying objects to be displayed as an upper limit. However, the present invention is not limited to such an embodiment. For example, the upper-limit number of identifying objects to be displayed may be changed depending on the number of detected identifying objects.

One specific embodiment is explained hereinafter in conjunction with FIG. 9 and FIG. 10. In this embodiment, to facilitate the understanding of the invention, the explanation is made mainly with respect to the constitution and the processes which differ from the constitution and the processes in the previous embodiments and the explanation of the constitution and the processes substantially equal to the constitution and the processes in the previous embodiments is omitted.

[Display Number Deciding Table]

A display number deciding table shown in FIG. 9 is stored in the above-mentioned flash memory 102. The display number deciding table is a table which is used for deciding the upper-limit number of identifying objects about which content information is to be displayed. In the display number deciding table, the number of identifying objects and the number of associated information to be displayed are associated with each other. To be more specific, when the number of identifying objects is 1 to 10, the number of associated information to be displayed is set to 4, when the number of identifying objects is 11 to 20, the number of associated information to be displayed is set to 5, and when the number of identifying objects is 21 or more, the number of associated information to be displayed is set to 6.

In this embodiment, the number of associated information to be displayed is decided based on the number of identifying objects detected in the imaging area A. However, the present invention is not limited to this embodiment. For example, the number of associated information to be displayed may be decided based on the number of identifying objects detected in a selection range (search range deciding distance, search range deciding angle) in the imaging area A.

[Identifying Object Selection Process]

Figure 10:
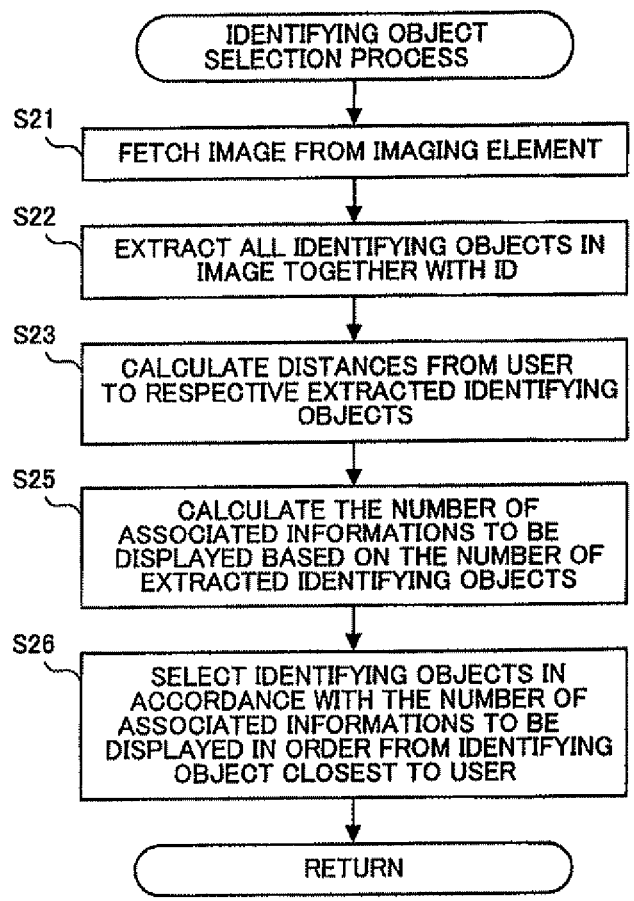
FIG. 10 is a flowchart showing an exemplary process for controlling the HMD.

The sub routine executed in step S13 shown in FIG. 6 is explained in conjunction with FIG. 10.

Firstly, as shown in FIG. 10, the control part 110 fetches the image from an imaging element (step S21), and extracts all identifying objects in the image together with IDs (step S22). Then, the control part 110 calculates distances between the HMD1 and the respective extracted identifying objects (step S23). When this process is finished, the process advances to step S25.

In step S25, the control part 110 calculates the number of associated information to be displayed based on the number of extracted identifying objects. In this process, the control part 110 counts the number of the identifying objects extracted in the imaging area A. Then, the control part 110 references the display number deciding table shown in FIG. 9, calculates the number of associated information to be displayed based on the number of identifying objects in the imaging area A, and stores the number of associated information to be displayed in a predetermined region of the RAM 103. When this process is finished, the process advances to step S26.

In step S26, the control part 110 selects the identifying objects about which associated information is displayed in order from the identifying object nearest to the HMD 1. In this process, the control part 110 references the number of associated information to be displayed which is calculated in step S25. The control part 110 selects the identifying objects within the search range deciding distance in order from the identifying object nearest to the HMD 1 using the referenced number of associated information to be displayed as an upper limit, and stores the selected identifying objects in a predetermined region of the RAM 103. That is, the control part 110 selects the identifying objects about which associated information is displayed based on the number of identifying objects within the detected imaging area A. By executing such processing, the CPU 101 of the control part 110 functions as the identifying object selection unit 205. When this process is finished, this subroutine is finished.

In this manner, the identifying objects about which associated information is displayed are selected based on the number of identifying objects in the detected imaging region and hence, the identifying objects about which associated information is displayed can be selected corresponding to the number of identifying objects whereby the manipulation of the HMD 1 becomes simple. Particularly, by setting the number of identifying objects about which associated information is displayed large when the number of identifying objects becomes large, the user can visually recognize the number of identifying objects within the imaging area, and the user can shorten time for visually recognizing all associated information.

Fourth Embodiment

In the above-mentioned embodiments, the identifying objects about which content information is displayed are selected based on the positional relationship between the detected identifying objects and the user. However, the present invention is not limited to such an embodiment. For example, the identifying objects about which content information is displayed may be selected based on IDs of the identifying objects, that is, kinds of identifying objects. Further, for example, the identifying objects about which content information is displayed may be selected based on elements selected from a group consisting of distances between detected identifying objects and a user, angles which straight lines which connects the identifying objects detected by the identifying object detection unit and the user and the direction extending toward a front side of the user make, kinds of identifying objects and the like. Further, although the selection range is set in advance in the above-mentioned embodiments, the present invention is not limited to the above-mentioned embodiments. For example, the selection range may be changeable corresponding to a manipulation of a manipulation unit. Further, although the number of associated information to be displayed which becomes an upper limit is set in advance in the above-mentioned embodiments, the present invention is not limited to such a case. For example, the number of associated information to be displayed may be changeable corresponding to the manipulation of a manipulation unit.

One specific embodiment is explained hereinafter in conjunction with FIG. 4E, FIG. 11, FIG. 14A and FIG. 14B. In this embodiment, to facilitate the understanding of the invention, the explanation is made mainly with respect to the constitution and processes which differ from the constitution and the processes in the previous embodiments and the explanation of the constitution and the processes substantially equal to the constitution and the processes in the previous embodiments is omitted.

[Electric Constitution of HMD]

Figure 11:
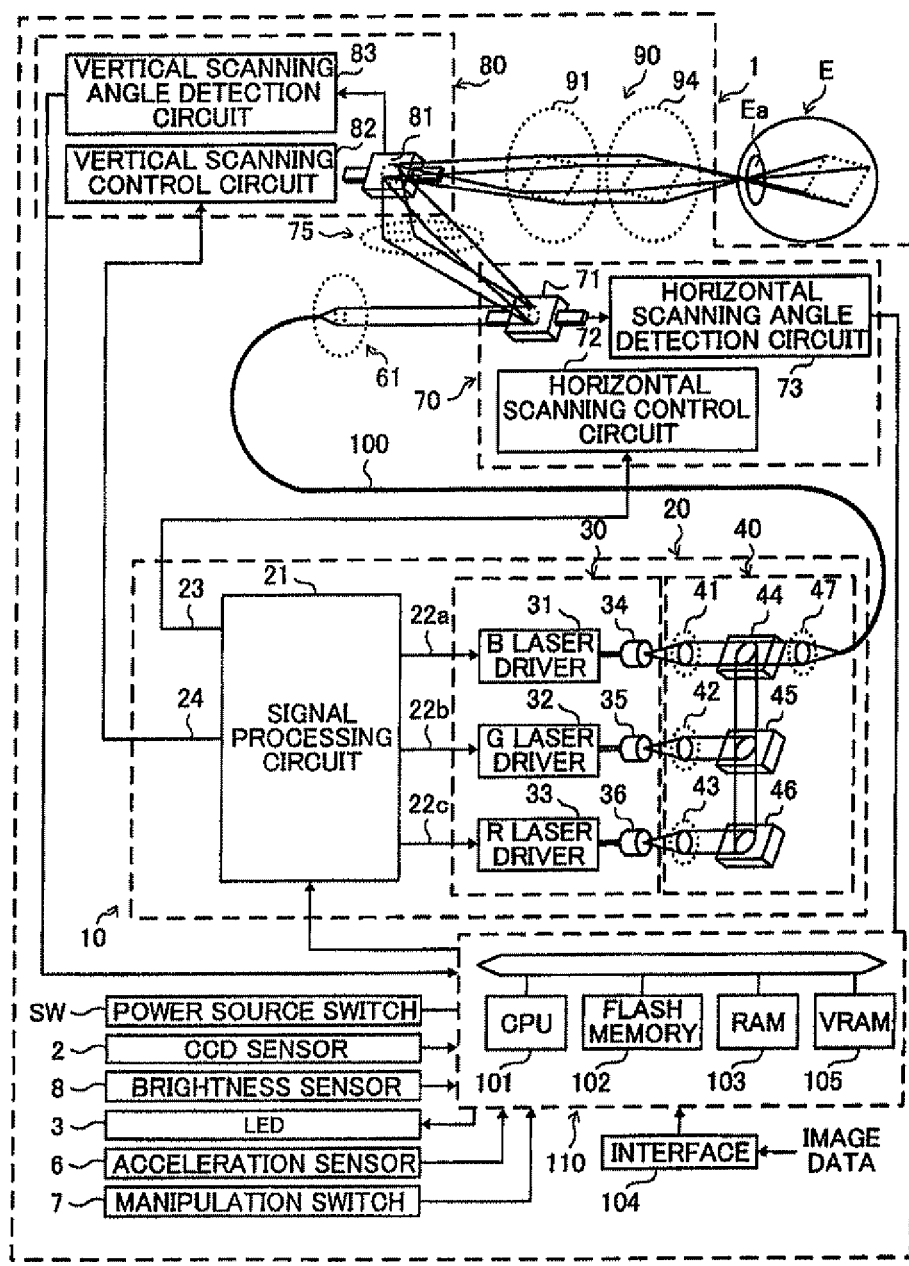
FIG. 11 is an explanatory view showing the electric and optical constitution of the HMD according to one embodiment of the present invention.

Here, the electric constitution and the like of the HMD 1 according to this embodiment are explained in conjunction with FIG. 11.

As shown in FIG. 11, the control part 110 is also connected to an acceleration sensor 6 which detects displacement of the HMD 1 and a manipulation switch 7 which the user can manipulate.

[Functional Constitution of HMD]

Figure 12:
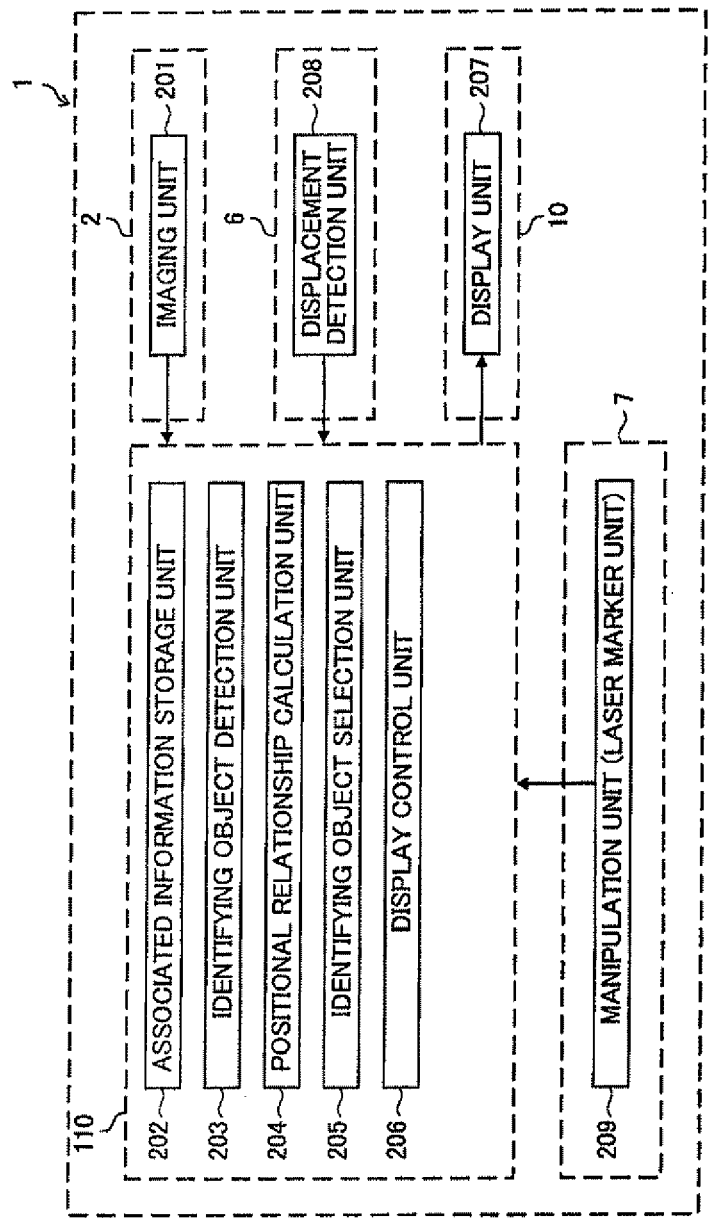
FIG. 12 is an explanatory view showing the functional constitution of the HMD according to one embodiment of the present invention.

Here, the functional constitution and the like of the HMD 1 according to this embodiment are explained in conjunction with FIG. 12.

As shown in FIG. 12, the acceleration sensor 6 of the HMD 1 includes a displacement detection unit 208. The displacement detection unit 208 detects displacement of the HMD 1.

Further, the manipulation switch 7 of the HMD 1 includes a manipulation unit 209. The user can manipulate the manipulation unit 209.

[Display Contents of HMD]

Figure 4E:
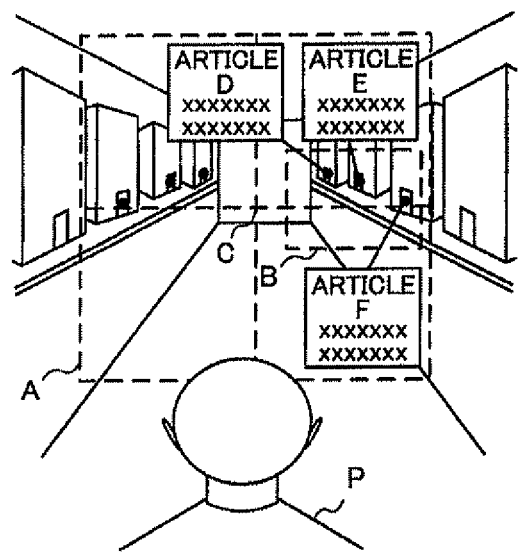
FIG. 4E is an explanatory view showing display contents and the like obtained by the HMD according to one embodiment of the present invention.

In this embodiment, the search range deciding distance, the search range deciding angle and the selection range can be changed by manipulating the manipulation switch 7. For example, when the search range deciding angle is changed, as shown in FIG. 4E, a search range deciding angle image B indicative of the search range deciding angle is changed and is displayed. Further, the identifying objects about which content information is displayed are changed in response to a change of the search range deciding angle (for example, the identifying objects being changed to the article D, the article E, the article F and the like).

[Main Process]

Firstly, as shown in FIG. 6, when electricity is supplied to the HMD 1, the control part 110 performs the initial setting (step S11). In this process, the control part 110 executes the RAM access permission, the initialization of a working area and the like. Particularly, in an initial state, the control part 110 sets the whole imaging area A imaged by the imaging unit 201 as the selection range of the identifying objects about which associated information is displayed. When this process is finished, the process advances to step S12.

[Various Setting Process]

In the process in step S15 shown in FIG. 6, a various setting process is executed at predetermined timings. Such a sub routine is explained in conjunction with FIG. 13A and FIG. 13B.

Figure 13A:
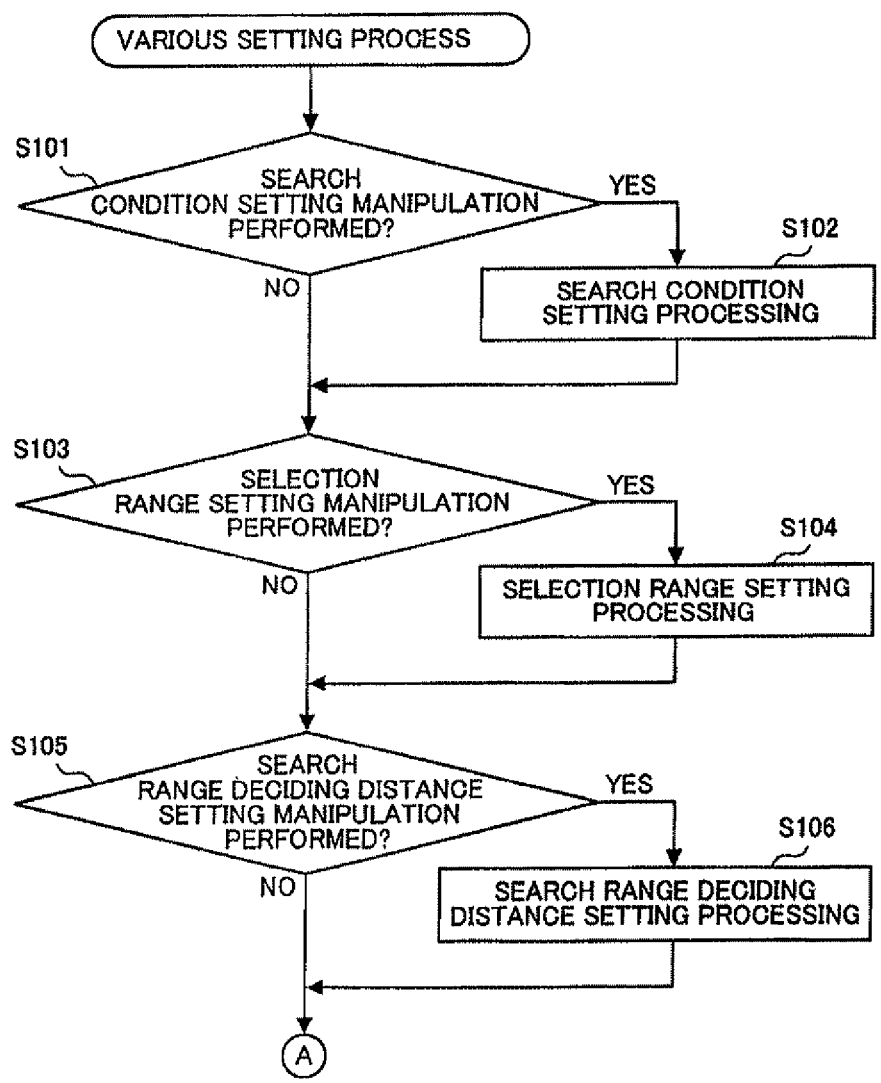
FIG. 13A is a flowchart showing an exemplary process for controlling the HMD.
Figure 13B:
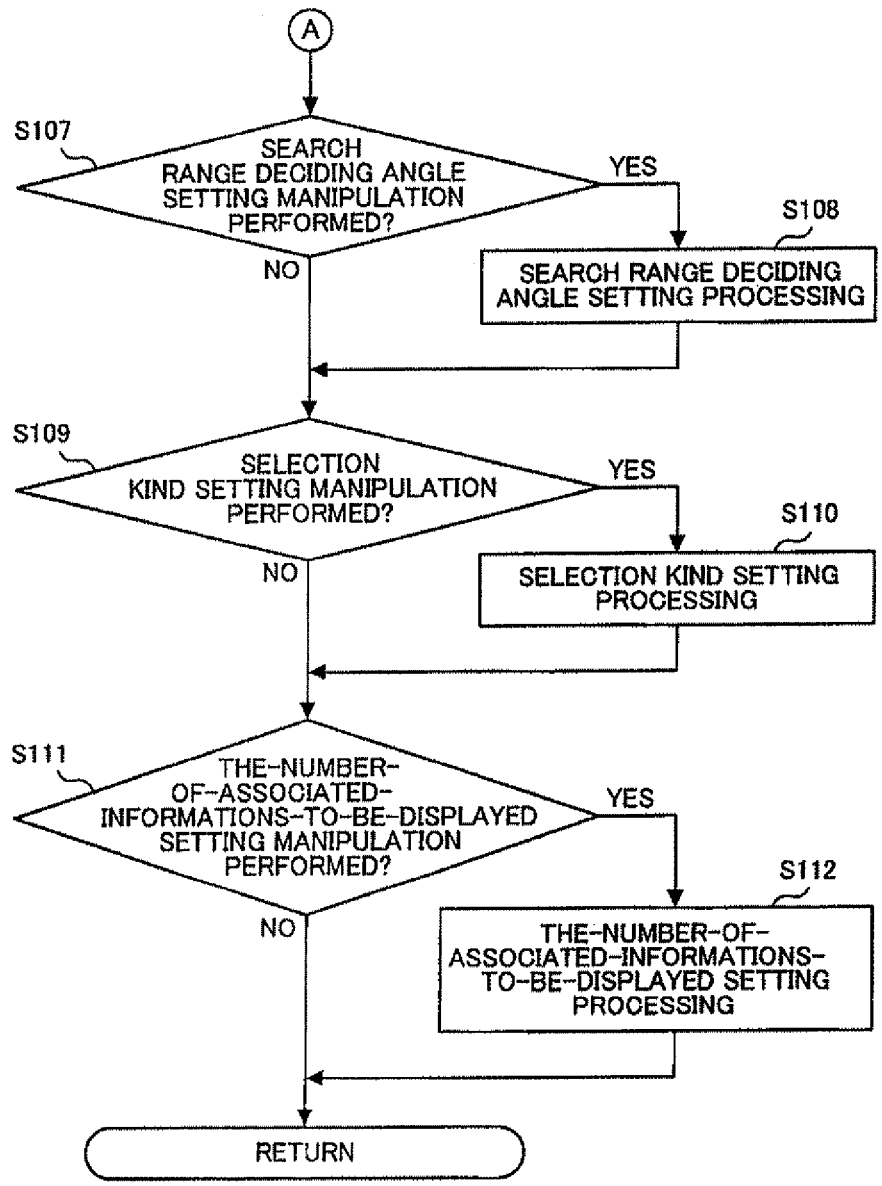
FIG. 13B is a flowchart showing an exemplary process for controlling the HMD.

Firstly, as shown in FIG. 13A and FIG. 13B, the control part 110 determines whether or not a search condition setting manipulation is performed (step S101). In this process, the control part 110 determines whether or not the search condition setting manipulation is performed in response to the manipulation of the manipulation switch 7 or the like.

When the control part 110 determines that the search condition setting manipulation is performed (step S101: YES), the control part 110 executes search condition setting processing (step S102), and the process advances to step S103. In this search condition setting processing, the control part 110 sets a search condition. Here, the search condition means search criteria for displaying of content information associated with the identifying objects. To be more specific, at least one of the distances between the user and the identifying objects, angles made by straight lines which connect the identifying objects and the user and the direction extending toward a front side of the user, and kinds of identifying objects is used as the criteria.

On the other hand, when the control part 110 determines that the search condition setting manipulation is not performed (step S101: NO), the process advances to step S103 without executing the process in step S102.

In step S103, the control part 110 determines whether or not a selection range setting manipulation is performed. In this processing, the control part 110 determines whether or not the selection range setting manipulation is performed in response to the manipulation of the manipulation switch 7 or the like.

When the control part 110 determines that the selection range setting manipulation is performed (step S103: YES), the control part 110 executes selection range setting processing (step S104), and the process advances to step S105. In this selection range setting processing, the control part 110 sets the selection range. Here, the selection range means the search range deciding distance or the search range deciding angle and, in response to the manipulation of the manipulation switch 7, as shown in FIG. 4E, the search range deciding angle image B indicative of the search range deciding angle can be changed, for example.

On the other hand, when the control part 110 determines that the selection range setting manipulation is not performed (step S103: NO), the process advances to step S105 without executing the process in step S104.

In step S105, the control part 110 determines whether or not a search range deciding distance setting manipulation is performed. In this process, the control part 110 determines whether or not the search range deciding distance setting manipulation is performed in response to the manipulation of the manipulation switch 7 or the like.

When the control part 110 determines that the search range deciding distance setting manipulation is performed (step S105: YES), the control part 110 executes search range deciding distance setting processing (step S106), and the process advances to step S107. In this search range deciding distance setting processing, the control part 110 performs the setting of the search range deciding distance similar to the setting of the search range deciding distance in the above-mentioned embodiment.

On the other hand, when the control part 110 determines that the search range deciding distance setting manipulation is not performed (step S105: NO), the process advances to step S107 without executing the process in step S106.

In step S107, the control part 110 determines whether or not a search range deciding angle setting manipulation is performed. In this process, the control part 110 determines whether or not the search range deciding angle setting manipulation is performed in response to the manipulation of the manipulation switch 7 or the like.

When the control part 110 determines that the search range deciding angle setting manipulation is performed (step S107: YES), the control part 110 executes search range deciding angle setting processing (step S108), and the process advances to step S109. In this search range deciding angle setting processing, the control part 110 performs the setting of the search range deciding angle similar to the setting of the search range deciding angle in the above-mentioned embodiment.

On the other hand, when the control part 110 determines that the search range deciding angle setting manipulation is not performed (step S107: NO), the process advances to step S109 without executing the process in step S108.

In step S109, the control part 110 determines whether or not a selection kind setting manipulation is performed. In this process, the control part 110 determines whether or not the selection kind setting manipulation is performed in response to the manipulation of the manipulation switch 7 or the like.

When the control part 110 determines that the selection kind setting manipulation is performed (step S109: YES), the control part 110 executes selection kind setting processing (step S110), and the process advances to step S111. In this selection kind setting processing, the control part 110 performs the setting of the selection kind. Here, the selection kind means a kind of identifying object to be searched, and kinds of media such as DVD, CD or books, or genres such as actions, romance dramas, human dramas, suspense dramas and the like are named as the selection kinds.

On the other hand, when the control part 110 determines that the selection kind setting manipulation is not performed (step S109: NO), the process advances to step S111 without executing the process in step S110.

In step S111, the control part 110 determines whether or not the manipulation for setting the number of associated information to be displayed is performed. In this process, the control part 110 determines whether or not the manipulation for setting the number of associated information to be displayed is performed in response to the manipulation of the manipulation switch 7 or the like.

When the control part 110 determines that the manipulation for setting the number of associated information to be displayed is performed (step S111: YES), the control part 110 executes the process for setting the number of associated information to be displayed (step S112), and the sub routine is finished. In this process for setting the number of associated information to be displayed, the control part 110 performs the setting of the number of associated information to be displayed similar to the setting of the number of associated information to be displayed in the above-mentioned embodiment.

On the other hand, when the control part 110 determines that the manipulation for setting the number of associated information to be displayed is not performed (step Sill: NO), the sub routine is finished without executing the process in step S112.

[Identifying Object Selection Process]

Figure 14A:
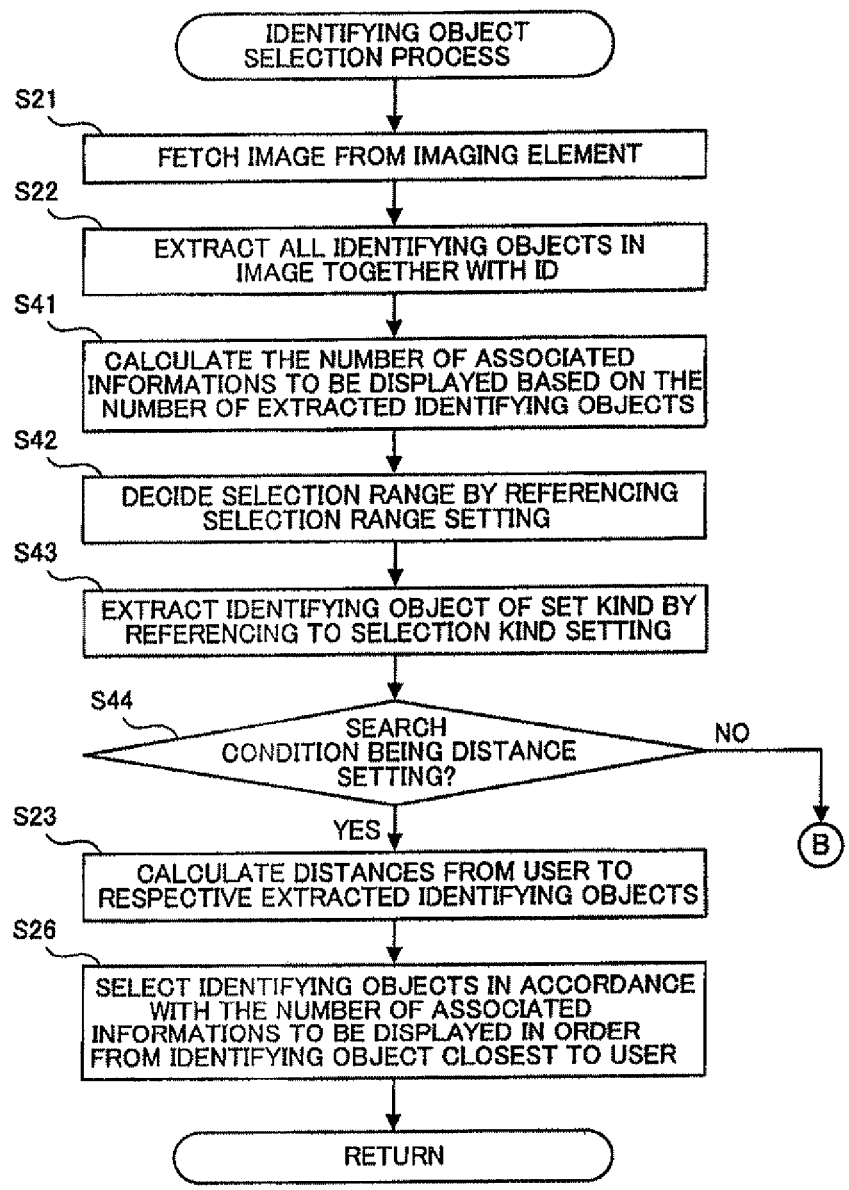
FIG. 14A is a flowchart showing an exemplary process for controlling the HMD.
Figure 14B:
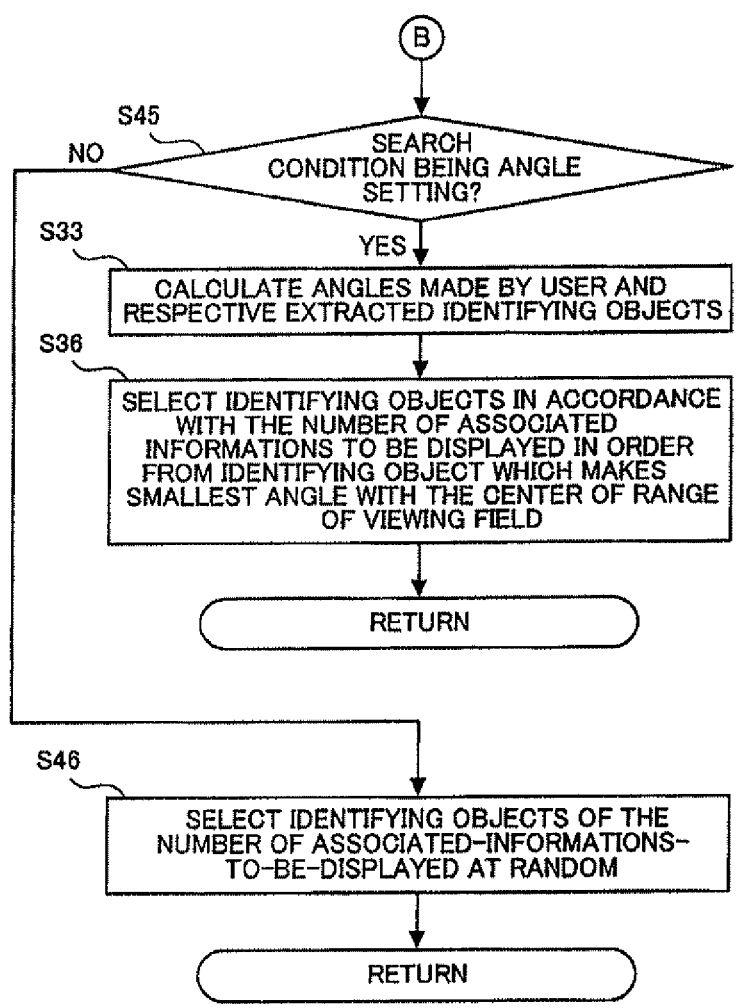
FIG. 14B is a flowchart showing an exemplary process for controlling the HMD.

The sub routine executed in step S13 shown in FIG. 6 is explained in conjunction with FIG. 14A and FIG. 14B.

Firstly, as shown in FIG. 14A and FIG. 14B, the control part 110 fetches the image from the imaging element (step S21), and extracts all identifying objects in the image together with the IDs (step S22). When this process is finished, the process advances to step S41.

In step S41, the control part 110 calculates the number of associated information to be displayed based on the number of the extracted identifying objects. In this process, the control part 110 calculates the number of identifying objects extracted within the imaging area A. Then, the control part 110 calculates the number of associated information to be displayed based on the number of the identifying objects within the imaging area A by referencing the number of associated information to be displayed which is set in the process in step S111. Further, the control part 110 stores the number of associated information to be displayed in a predetermined region of the RAM 103. When this process is finished, the process advances to step S42.

In step S42, the control part 110 decides the selection range by referencing the selection range setting which is performed in the process in step S104. When the selection range setting is not performed in step S104, the imaging area A becomes the selection range in accordance with the setting in an initial state. When this process is finished, the process advances to step S43.

When the search condition based on kinds is set in step S102, in step S43, the control part 110 extracts the identifying objects of the set kind by referencing the selection kind setting which is set in the process in step S110. When this process is finished, the process advances to step S44.

In step S44, the control part 110 determines whether or not the search condition is distance setting. In this process, the control part 110 determines whether or not the search condition is the distance setting by referencing the search condition based on kinds which is set in step S102.

When the control part 110 determines that the search condition is the distance setting (step S44: YES), as described previously, the control part 110 calculates the distances between the respective identifying objects which are extracted by executing the process in step S41 to step S43 and the HMD 1 (step S23), and selects the identifying objects in accordance with the number of associated information to be displayed in order from the identifying object closest to the user (step S26). When this process is finished, the sub routine is finished.

On the other hand, when the control part 110 determines that the search condition is not the distance setting (step S44: NO), the process advances to step S45.

In step S45, the control part 110 determines whether or not the search condition is angle setting. In this process, the control part 110 determines whether or not the search condition is the angle setting by referencing the search condition based on kinds which is set in step S102.

When the control part 110 determines that the search condition is the angle setting (step S45: YES), as described previously, the control part 110 calculates the angles made by the respective identifying objects extracted by executing the process in step S41 to step S43 and the user (step S33), and selects the identifying objects in accordance with the number of associated information to be displayed in order from an identifying object having the smallest angle on the basis of the center of the range of the viewing field (step S36). When this process is finished, the sub routine is finished.

On the other hand, when the control part 110 determines that the search condition is not the angle setting (step S45: NO), the control part 110 selects the identifying objects in accordance with the number of associated information to be displayed at random out of the identifying objects extracted by executing the process in step S41 to step S43 (step S46). When this process is finished, the sub routine is finished.

In this manner, the identifying objects about which associated information is displayed are selected based on kinds of detected identifying objects. Accordingly, the selection of the identifying objects associated with the kinds of identifying objects can be performed.

Further, the whole area of the imaging area is set as the selection range in an initial state. Accordingly, even in the initial state, the identifying objects in the whole imaging area can be detected and hence, the incomplete detection of the identifying objects can be prevented and the manipulation of the HMD 1 becomes simple.

Still further, the control part 110 performs a control of allowing the display unit to display the selection range, and changes the selection range in response to the manipulation by a user. Accordingly, the user can select the identifying objects within the selection range which the user wants to select, and the manipulation becomes simple.

Other Embodiments

In the above-mentioned embodiments, various setting and decisions are made in response to manipulations of the manipulation switch 7. However, the present invention is not limited to such setting or decision making, and various setting and decisions may be made by using an acceleration sensor 6 mounted on the HMD 1 as described previously, for example. Further, instead of the manipulation switch 7 mounted on the HMD 1 per se, a laser marker may be used as a manipulation unit and various setting and decisions may be made by determining whether or not a laser beam is irradiated.

Figure 4F:
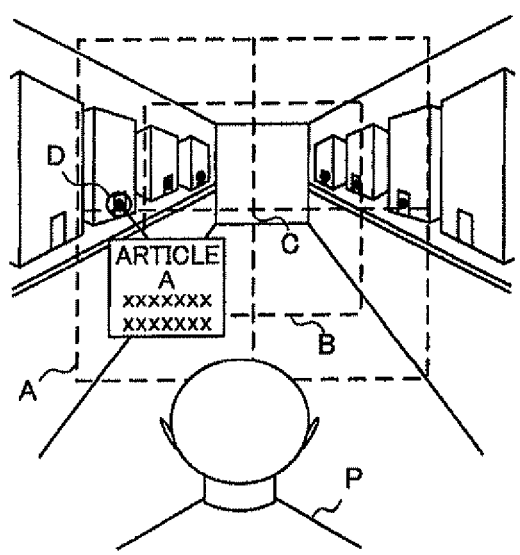
FIG. 4F is an explanatory view showing display contents and the like obtained by the HMD according to one embodiment of the present invention.

To be more specific, for example, as shown in FIG. 4F, by designating an identifying object using the laser marker, a laser beam spot is recognized from an image imaged in the imaging area A, and content information associated with the designated identifying object can be displayed.

In this manner, the user can irradiate a laser beam toward the identifying object using the laser marker, and the identifying objects about which associated information is displayed can be selected corresponding to the irradiated laser beam.

Accordingly, the identifying object can be selected without directly connecting the laser marker to the HMD 1 and hence, the manipulation becomes simple. Further, since the identifying object can be directly designated using the irradiation of the laser beam, the manipulation becomes simple.

Further, for example, the above-mentioned laser beam is irradiated to an identifying object, and when a user P nods, the HMD 1 recognizes that the HMD 1 is displaced in the longitudinal direction, and content information associated with the identifying object to which the laser beam is irradiated can be displayed.

In this manner, the displacement of the HMD is detected, and the identifying object about which associated information is displayed by the display unit is selected when the HMD detects the displacement. Accordingly, even when a particular manipulation unit is not mounted on the HMD, the identifying object about which associated information is displayed can be selected. Further, the user can select the identifying object about which associated information is displayed even when his hand or the like is not used.

Further, for example, when the above-mentioned laser beam is irradiated to an identifying object and it is recognized that the HMD 1 is not displaced for a predetermined time based on the lapse of the predetermined time after a user P fixes his neck, it is possible to set the identifying object to which the laser beam is irradiated as the identifying object about which content information is to be displayed.

In this manner, when the displacement of the HMD is detected and the HMD is not displaced for a predetermined time, an identifying object which is selected temporarily is confirmed as an identifying object about which associated information is displayed. Accordingly, the identifying object which is selected temporarily can be confirmed as an identifying object about which associated information is displayed even when a particular manipulation means is not provided. Further, the identifying object which is selected temporarily can be confirmed as an identifying object about which associated information is displayed even when his hand or the like is not used.

In the above-mentioned embodiments, various processing have been performed by the HMD 1 per se. However, the present invention is not limited such a case, and various processing may be performed by allowing the HMD 1 to perform communication via network, for example.

Figure 15:
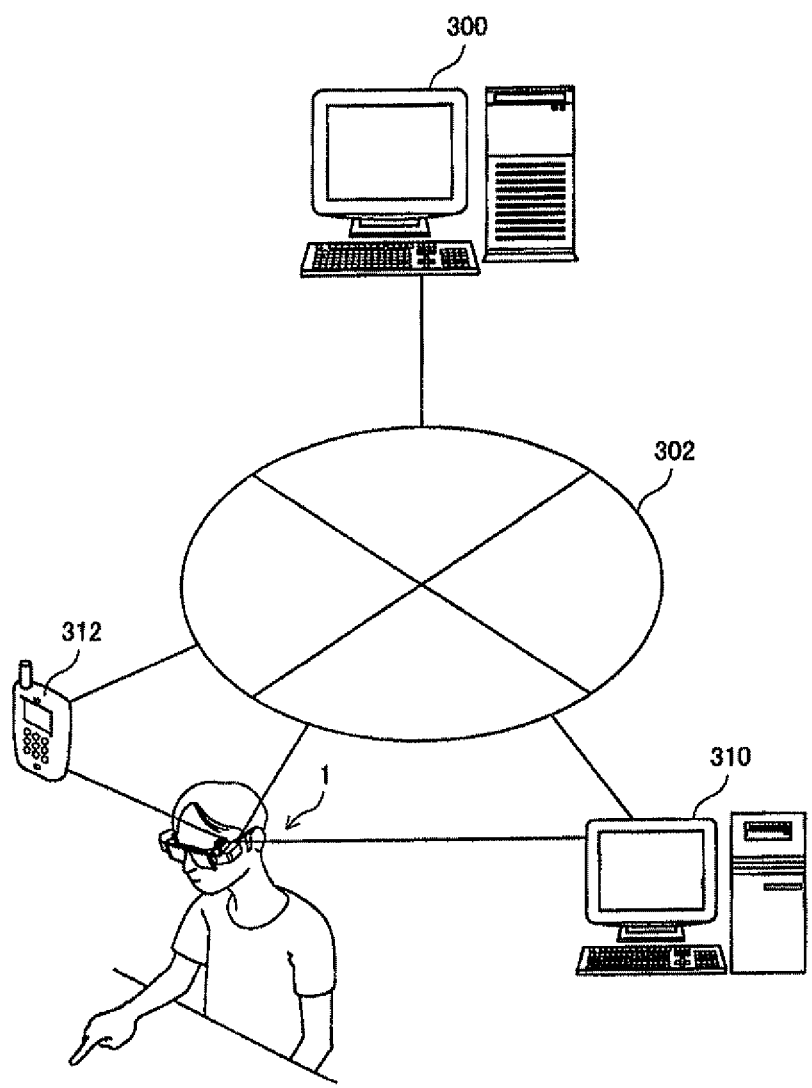
FIG. 15 is an explanatory view showing the electric constitution of the HMD according to one embodiment of the present invention.

As a specific example, as shown in FIG. 15, an HMD 1, a server 300, a personal computer 310 and a personal digital assistant 312 are connected to a network 302 and these devices are communicable with each other via the network 302. In such a case, for example, content information and kinds or the like of the content information may be stored in the server 300, and a user may acquire such information through the communication between the HMD 1 and the server 300 at predetermined timing. Further, the communication may be performed via the personal computer 310 or the personal digital assistant 312.

In the above-mentioned embodiments, the HMD 1 includes the manipulation switch 7 and the like, and various processing is performed by the HMD 1 per se in response to the manipulation of the manipulation switch 7. However, the present invention is not limited to such processing. For example, as shown in FIG. 15, manipulation signals may be supplied to the HMD 1 by connecting the HMD 1, the personal computer 310 and the personal digital assistant 312 to each other and by making these devices communicable with each other

The invention claimed is:

1. A head mounted display comprising:
a display unit which is configured to project image light corresponding to display information onto an eye of a user thus allowing the user to visually recognize an image corresponding to the image light while allowing an external light to pass therethrough;
an imaging unit which is configured to image at least a portion of a range of the viewing field of the user;
an identifying object detection unit which is configured to detect identifying objects within an imaging area defined by the imaging unit;
an associated information storage unit which is configured to store associated information associated with the respective identifying objects;
an identifying object selection unit which is configured to select the identifying object about which the associated information associated with the selected identifying object is displayed by the display unit based on a result detected by the identifying object detection unit; and
a display control unit which is configured to perform a control of allowing the display unit to display the associated information which is stored in the associated information storage unit and is associated with the identifying object which is selected by the identifying object selection unit in association with the identifying object which is visually recognized by the user through the display unit in a see-through manner, wherein
the identifying object selection unit is configured to set a selection range of the identifying object about which the associated information associated with the identifying object is displayed within the imaging area based on a positional relationship between the identifying object detected by the identifying object detection unit and the user, and is configured to select at least any one of the identifying objects within the selection range as the identifying object about which the associated information is displayed, and
the identifying object selection unit is configured to select the identifying object about which the associated information is displayed by setting a distance between the identifying object detected by the identifying object detection unit and the user as the positional relationship.

2. The head mounted display according to claim 1, wherein the identifying object selection unit is configured to select the identifying object about which the associated information is displayed by setting an angle made by a straight line which connects the identifying object detected by the identifying object detection unit and the user and the direction extending toward a front side of the user as the positional relationship.

3. The head mounted display according to claim 2, wherein the identifying object selection unit is configured to select the identifying object about which the associated information is displayed by assigning priority to the identifying object having a near positional relationship on the basis of the center of the range of the viewing field of the user out of the identifying objects detected by the identifying object detection unit.

4. The head mounted display according to claim 1, further comprising a positional relationship calculation unit which is configured to calculate the positional relationship based on a range constituted of imaged pixels imaged by the imaging unit as the identifying object.

5. The head mounted display according to claim 1, wherein the identifying object selection unit is configured to set a whole area of the imaging area imaged by the imaging unit as the selection range in an initial state.

6. The head mounted display according to claim 1, further comprising a manipulation unit which is operable by the user, wherein the display control unit is configured to perform a control of allowing the display unit to display the selection range, and the identifying object selection unit is configured to change the selection range corresponding to a manipulation of the manipulation unit.

7. The head mounted display according to claim 1, wherein the identifying object selection unit is configured to select the identifying object about which the associated information is displayed based on the number of identifying objects within the imaging area detected by the identifying object detection unit.

8. The head mounted display according to claim 1, wherein the identifying object selection unit is configured to select the identifying object about which the associated information is displayed based on a kind of identifying object detected by the identifying object detection unit.

9. The head mounted display according to claim 1, further comprising a laser marker unit capable of irradiating a laser beam toward the identifying object by the user, wherein the identifying object selection unit is configured to select the identifying object about which the associated information is displayed corresponding to the laser beam irradiated by the laser marker unit.

10. The head mounted display according to claim 1, further comprising a displacement detection unit which is configured to detect displacement of the head mounted display, wherein the identifying object selection unit is configured to, when the displacement of the head mounted display is detected by the displacement detection unit, select the identifying object about which the associated information associated with the identifying object is displayed by the display unit.

11. The head mounted display according to claim 1, further comprising a displacement detection unit which is configured to detect displacement of the head mounted display, wherein the identifying object selection unit is configured to, when the head mounted display is not displaced by the displacement detection unit for a predetermined time, determine an identifying object which is selected temporarily as the identifying object about which the associated information is displayed.

* * * * *